United States Patent Office 3,104,978
Patented Sept. 24, 1963

3,104,978
NEW PHOSPHATE COMPOSITION FOR CURING MEAT AND PROCESS FOR PRODUCING SAME
Eugene V. Elder, Jr., Jeffersonville, Ind., assignor to Hooker Chemical Corporation, Niagara Falls, N.Y., a corporation of New York
No Drawing. Filed Dec. 7, 1960, Ser. No. 74,246
5 Claims. (Cl. 99—222)

This invention relates to a novel composition of matter suitable for use as a component of meat curing pickles and to the process for preparing said composition. More particularly, this invention relates to a novel alkali metal phosphate composition suitable for use as a component of meat curing pickles and to a method for preparing this composition.

Numerous compositions have been prepared for use in improving the color and taste of meat such as beef, pork, mutton, veal, hams, both smoked and canned, butts, picnics, loins, sausage such as frankfurters, bologna, and the like. In addition, certain compositions are added to these meat products to inhibit dehydration of the protein constituents of the meat, thereby reducing the weight loss of the meat during storage and curing. Alkali metal phosphates which have been previously available for use as components of meat curing media are sodium phosphates having an $Na_2O$ to $P_2O_5$ molar ratio up to 1.7:1. Such alkali metal phosphates, which have a pH in a one percent aqueous solution of the order of about 9.8 have some effect upon inhibiting dehydration of the meat products when injected into the arteries and/or muscles of meat, or otherwise contacted with the meat. It is believed that as the pH of the meat is increased above the isoelectric point, the dehydration rate of the protein constituents of the meat is decreased. When alkali metal phosphates which have been previously available for use in meat curing media are employed, an amount of these alkali metal phosphates, greater than about 0.5 percent by weight of the meat, is generally necessary to obtain a pH in the meat that will satisfactorily inhibit dehydration. When the previously available alkali metal phosphates are contacted with the meat, especially in excessive amounts, they tend to crystallize in the meat in the form of hard crystals or plates, which not only affect the taste and appearance of the cured meat, but also impart gritty characteristics to the meat which is undesirable for consumer acceptance. Thus, it can be seen that the alkali metal phosphate compositions previously available to the industry for use in meat curing media are objectionable for several reasons.

It is an object of this invention to provide a new composition of matter and a process for preparing this composition.

Still another object of this invention is to provide a novel alkali metal phosphate composition suitable for use as a component of meat curing media, and a method for preparing this composition.

It is a further object of this invention to provide a novel composition and method for preparing this composition which improves the hydration of meat.

Still another object of the invention is to provide a novel composition and method for preparing this composition which improves the color retaining properties of cured meat.

Another object of the invention is to provide a novel composition and method for preparing this composition which does not impart an off-flavor to cured meats.

A further object of the invention is to provide an alkali metal phosphate composition having a relatively high pH which may be added to meat in relatively small proportions to inhibit dehydration of the meat.

These and other objects are accomplished by my invention and discoveries as set forth in the following detailed description.

It has now been discovered that a novel alkali metal phosphate composition can be prepared by reacting an alkali metal tripolyphosphate with an alkali metal compound selected from the group consisting of alkali metal hydroxides, trialkali metal phosphates and mixtures thereof, in proportions sufficient to provide an $R_2O$ to $P_2O_5$ molar ratio in the reaction product of between about 1.8:1 and about 1.95:1, where R is an alkali metal selected from the group consisting of sodium, potassium, and mixtures thereof. Sufficient water is present during the reaction to disperse the alkali metal compound and yield a homogeneous product. The novel product is a partially condensed, at least partially hydrated, amorphous alkali metal phosphate having a pH in a one percent aqueous solution of between about 10.5 and about twelve. Meat treated with this novel compound has a good taste and texture, and has excellent hydration retaining properties without crystallization of the novel alkali metal phosphate as hard crystals or plates in the fibers of the cured meat. The term "alkali metal," as used throughout the description and claims is intended to include sodium, potassium, and mixtures thereof.

More in detail, any condensed, anhydrous alkali metal tripolyphosphate in crystalline or glass form may be employed as the starting material. Typical examples of suitable alkali metal tripolyphosphates include pentasodium tripolyphosphate, pentapotassium tripolyphosphate, and mixtures thereof. It is preferred to employ the "beaded" light density sodium tripolyphosphate of commerce, which has a density of between about twenty-five and about forty-three pounds per cubic foot, but any alkali metal tripolyphosphate in finely divided or granular form may be employed.

The alkali metal tripolyphosphate is reacted in the presence of water with a strongly basic alkali metal compound which is capable of at least partially hydrating the tripolyphosphate. Typical examples of suitable alkali metal compounds include sodium hydroxide, potassium hydroxide, trisodium phosphate, tripotassium phosphate, and mixtures thereof. The alkali metal tripolyphosphate and alkali metal compound are reacted in proportions to provide an $R_2O$ to $P_2O_5$ molar ratio in the reaction product of between about 1.8:1 and about 1.95:1, and preferably between about 1.8:1 and about 1.9:1.

The reaction may be effected by any one of several techniques. In one embodiment, the alkali metal tripolyphosphate is reacted with an aqueous solution of the alkali metal compound. The amount of water used to dissolve the alkali metal compound is generally no greater than that necessary to obtain a homogeneous reaction between the alkali metal compound and the alkali metal tripolyphosphate. Generally the maximum amount of water in the aqueous solution of alkali metal compound is equal to about half the amount necessary to completely hydrate the alkali metal tripolyphosphate. Preferably water is added in a proportion equivalent to between about eight and about thirteen percent by weight of the reaction mixture, and more preferably, between about nine and about twelve percent by weight of the reaction mixture. When the water content is controlled in this manner it is possible to obtain adequate dispersion of the strongly basic alkali metal compound on the particles of alkali metal tripolyphosphate, thus effecting a substantially complete reaction and yielding a substantially homogeneous product. In addition, water added to the reaction mixture forms water of hydration in the reaction product, and thus there is no need to subject the reaction product to a separate drying step in order to obtain a granular free-flowing product. It will be recognized that the density of the novel product will depend significantly upon the density of the alkali metal tripolyphosphate employed as a reactant.

In another embodiment of the invention, solid alkali metal tripolyphosphate and solid strongly basic alkali metal compound, both in finely divided or granular form may be admixed in the aforementioned proportions while simultaneously adding water in the aforesaid proportions.

The reaction may be effected in any suitable solid-liquid mixing apparatus such as a pug-mill, double blade mixer and the like. Mixing of the reactants is carried out for a sufficient length of time to effect substantially complete reaction and to produce a substantially homogeneous product. The reaction time will vary with the type of mixing apparatus employed, but generally the reaction may be completed in between about two and about six hours. However, greater or lesser reaction periods may be employed if desired.

The novel alkali metal phosphate composition may be dissolved in water or conventional meat curing pickles and injected or otherwise contacted with the meat by conventional techniques.

The novel modified alkali metal phosphate composition of the instant invention is particularly suitable for use in processes for meat treatment as developed by John T. Owen and described in his United States patent application, Serial No. 74,245, filed of even date herewith, now abandoned.

Conventional meat curing brines generally contain nitrites of sodium, nitrates of sodium, sodium chloride, and sugar such as dextrose, sucrose and the like. The nitric oxide producing salts, which are added to fix the color of the meat, are present in the meat curing brine in a proportion equivalent to between about 0.005 and about 0.25 percent of the solution. A somewhat greater amount of the nitrate may be added, for example, between about 0.005 and about one percent by weight of the meat curing solution. Sodium chloride is added in a proportion equivalent to between about ten and about thirty-five percent by weight of the meat curing brine. The proportion of the novel alkali metal phosphate composition is preferably between about one and about four percent by weight of the meat curing solution. If desired, sugar may be added to the brine in a proportion equivalent to between about two and about five percent by weight. The meat curing brine containing these ingredients in the aforesaid proportions generally has a pH between about six and about nine, and is preferably between about 7.5 and about nine.

The meat curing brine containing the novel alkali metal phosphate composition may be injected into the arteries of the meat and into the muscle of the meat by single or multiple injection needles. Any technique capable of effecting a uniform distribution of the meat curing brine throughout the meat may be employed. Sufficient meat curing brine is injected into the meat to provide up to about 0.5 percent by weight of the novel alkali metal phosphate composition in the meat. However, because of the markedly improved effectiveness of the novel alkali metal phosphate composition in curing meats, it is possible to use a much smaller proportion of this compound than conventional meat curing phosphate, thereby effecting a significant saving in meat curing operations.

After the meat is injected with the solution or brine containing the novel alkali metal phosphate composition, the meat may be smoked, cooked, boned, cured, canned, or otherwise treated. For example, ham treated with a meat curing brine containing the novel alkali metal phosphate composition may be boned and cleaned and then placed in a can or mold and cooked. After standing for several days canned hams so treated have excellent color retention, texture and protein hydration properties.

The following examples are presented to illustrate the invention more fully without any intention of being limited thereby. All parts and percentages are by weight unless otherwise specified.

*Example 1*

Granular sodium tripolyphosphate (fifty pounds), was placed in a double blade Sigma mixer. An aqueous solution of sodium hydroxide was prepared by admixing 8.4 pounds of a fifty percent aqueous sodium hydroxide solution with 3.6 pounds of water. This sodium hydroxide solution was slowly added to the tumbling granular sodium tripolyphosphate in the mixer. An additional fifty pounds of the granular sodium tripolyphosphate was added to the mixer and an additional twelve pounds of aqueous sodium hydroxide solution (prepared from 8.4 pounds of fifty percent aqueous sodium hydroxide solution and 3.6 pounds of water), was slowly added to the ingredients in the mixer. After addition of the caustic solution the ingredients were allowed to mix for about thirty minutes. The final weight of the product was about one hundred and twenty-three pounds. A portion of the product is dissolved in water to form an aqueous one percent solution of the novel alkali metal meat curing phosphate. This solution had a pH of 11.7. Chemical analysis of the novel alkali metal phosphate meat curing composition showed an Na content of 28.1 percent, and a P content of 20.34 percent, which was equivalent to an $Na_2O$ to $P_2O_5$ molar ratio of about 1.86. The product contained twelve percent free moisture, had a light color, contained no water insoluble material and contained approximately eighty percent condensed phosphate. The product was an amorphous solid, and by chemical and physical tests showed no evidence of free sodium hydroxide.

*Example 2*

A meat curing brine was prepared by admixing one hundred gallons of a salt brine (70° salometer) with sodium nitrite in a proportion equivalent to 2.5 pounds per hundred gallons of brine, sodium nitrate in a proportion equivalent to about ten ounces per hundred gallons of brine. The novel alkali metal phosphate composition, prepared as in Example 1, was dissolved in the brine in a proportion equivalent to twenty-five pounds of the novel alkali metal phosphate composition per hundred gallons of brine.

About two thousand pounds of green hams, which had an average weight of about thirty pounds each, were injected in the main artery and muscle areas, by means of a multi-needle injection device, with sufficient amount of the aforesaid meat curing brine to increase the weight of each ham by about ten percent. Each ham was then boned, placed in a can which was then sealed and cooked.

The canned hams were opened after about a week of storage, and some of them were cut into slices. The hams were found to have a uniform color, a good texture and an excellent taste. The hams were free from the metallic taste which sometimes characterizes hams treated with a conventional phosphate meat curing composition. There was no sign of crystalline or glassy hydrated phosphate particles which sometime appear in hams treated with conventional phosphate meat curing compositions. In addition the hams were firm and when pressed between a pair of hands little or no liquid came out of the hams, thus establishing the superior hydration retaining properties of hams treated with the novel alkali metal phosphate curing composition.

*Example 3*

The procedure of Example 2 was repeated, with the exception that the brine contained the novel alkali metal phosphate composition in a proportion equivalent to only about 12.5 pounds per hundred gallons of brine. The hams treated with this brine also had the improved characteristics obtained in Example 2.

It will be recognized by those skilled in the art that various modifications within the invention are possible, some of which are referred to above. Therefore, I do not wish to be limited, except as defined by the appended claims.

I claim:

1. A solid alkali metal phosphate composition, useful in meat curing, characterized by a high pH in aqueous solutions and the substantially complete absence of free alkali prepared by the process which comprises reacting in the presence of water, an alkali metal tripolyphosphate and a strongly basic alkali metal compound in proportions yielding a reaction product having a pH in a one percent aqueous solution of between about 10.5 and about 12, and an $R_2O$ to $P_2O_5$ molar ratio between about 1.80:1 and about 1.95:1, where R is selected from the group consisting of sodium, potassium and mixtures thereof, and recovering the granular, free flowing alkali metal phosphate composition thus produced.

2. A process for preparing an alkali metal phosphate composition, useful in meat curing, characterized by a high pH in aqueous solutions and the substantially complete absence of free alkali, which comprises reacting, in the presence of water, an alkali metal tripolyphosphate and a strongly basic alkali metal compound in proportions yielding a reaction product having a pH in a one percent aqueous solution of between about 10.5 and about 12, and an $R_2O$ to $P_2O_5$ molar ratio between about 1.80:1 and about 1.95:1, where R is selected from the group consisting of sodium, potassium and mixtures thereof, and recovering the granular, free flowing alkali metal phosphate composition thus produced.

3. The process as claimed in claim 2 wherein the amount of water present during the reaction between the alkali metal tripolyphosphate and the strongly basic alkali metal compound is between about eight and about thirteen percent by weight of the reaction mixture.

4. The process as claimed in claim 2 wherein the alkali metal tripolyphosphate is pentasodium tripolyphosphate and the strongly basic alkali metal compound is sodium hydroxide and the alkali metal phosphate composition prepared therefrom is a sodium phosphate composition.

5. The process as claimed in claim 2 wherein the alkali metal tripolyphosphate is pentapotassium tripolyphosphate, and the strongly basic alkali metal compound is potassium hydroxide and the alkali metal phosphate composition prepared therefrom is a potassium phosphate composition.

References Cited in the file of this patent

UNITED STATES PATENTS

| | | |
|---|---|---|
| 2,812,261 | Wasserman | Nov. 5, 1957 |
| 2,812,262 | Wasserman | Nov. 5, 1957 |
| 2,903,366 | Barnett | Sept. 8, 1959 |
| 3,032,421 | Buchholz | May 1, 1962 |